(12) United States Patent
Kawaguchi et al.

(10) Patent No.: US 10,145,465 B2
(45) Date of Patent: Dec. 4, 2018

(54) GEAR SHIFTER

(71) Applicant: DENSO CORPORATION, Kariya, Aichi-pref. (JP)

(72) Inventors: Yuusaku Kawaguchi, Kariya (JP); Jun Yamada, Kariya (JP)

(73) Assignee: DENSO CORPORATION, Kariya (JP)

( * ) Notice: Subject to any disclaimer, the term of this patent is extended or adjusted under 35 U.S.C. 154(b) by 435 days.

(21) Appl. No.: 15/088,413

(22) Filed: Apr. 1, 2016

(65) Prior Publication Data

US 2016/0290493 A1 Oct. 6, 2016

(30) Foreign Application Priority Data

Apr. 2, 2015 (JP) ................................. 2015-076274

(51) Int. Cl.
*F16H 59/00* (2006.01)
*F16H 59/02* (2006.01)
*F16H 59/08* (2006.01)

(52) U.S. Cl.
CPC ......... *F16H 59/0208* (2013.01); *F16H 59/08* (2013.01)

(58) Field of Classification Search
CPC .............................. F16H 59/0208; F16H 59/08
See application file for complete search history.

(56) References Cited

U.S. PATENT DOCUMENTS

| 8,942,898 | B2 * | 1/2015 | Yamada | F16H 59/105 477/34 |
|---|---|---|---|---|
| 9,115,804 | B2 * | 8/2015 | Ono | F16H 61/0213 |
| 9,416,868 | B2 * | 8/2016 | Yatou | F16H 59/105 |
| 9,581,238 | B2 * | 2/2017 | Noto | F16H 63/38 |
| 9,841,100 | B2 * | 12/2017 | Kawaguchi | F16H 61/18 |
| 9,884,616 | B2 * | 2/2018 | Jang | B60W 20/12 |
| 9,970,538 | B2 * | 5/2018 | Chen | F16H 59/08 |
| 2012/0123653 | A1 | 5/2012 | Kimura et al. | |

FOREIGN PATENT DOCUMENTS

JP 2013-59162 3/2013

* cited by examiner

*Primary Examiner* — David M Fenstermacher
(74) *Attorney, Agent, or Firm* — Nixon & Vanderhye P.C.

(57) ABSTRACT

A gear shifter performs an abutment learning, having a reference value learner that sets a reference value of a position signal when abutting a drive object to a stopper, and reduces warpage by (i) an all phase power supply supplying to the electric current to all of the plural phase coils of the direct current motor, and (ii) by reducing an amount of the electric current supplied to the coils, and by decreasing a pressing force of the drive object pressing the drive object against the stopper. The reference value determined at a warpage diminish time enables a reduction of variation of the reference value due to an influence of the warpage, thereby setting a robust reference value to account for an environmental condition such as a temperature change, for an accurate shift operation of the gear shifter.

3 Claims, 6 Drawing Sheets

GEAR SHIFTER

CROSS REFERENCE TO RELATED APPLICATION

The present application is based on and claims the benefit of priority of Japanese Patent Application No. 2015-076274, filed on Apr. 2, 2015, the disclosure of which is incorporated herein by reference.

TECHNICAL FIELD

The present disclosure generally relates to a shift range switch device, or a gear shifter, disposed in a vehicle, and more specifically, relates to a reference value check for checking a reference value of a signal indicative of a shift range, or a gear.

BACKGROUND INFORMATION

Conventionally, the shift range switch device, or the gear shifter, performs the reference value check by performing an "abutment learning" in a technical phrase in the art. For example, a patent document, JP 2013-59162 A (patent document 1) in the following discloses such a learning.

The gear shifter includes a drive object driven by a motor torque from a direct current motor to shift from one position to the other, for enabling a gear shifting of an automatic transmission, a stopper regulating a move range of the drive object on one end of the move range, a position detector outputting a position signal indicative of a position of a rotor of the motor, and a controller controlling an operation of the motor based on the position signal.

In the gear shifter of the patent document 1, the drive object is provided as a one-body combination of a detent plate and a control rod together with other parts, and the stopper is a detent spring. The position detector is an encoder included in an electric actuator.

Further, a microcomputer in an Steer By Wire-Electronic Control Unit (SBW-ECU) serving as the controller uses the position signal from the encoder as a signal indicative of a shift range, or a gear position, for determining to which the shift range, or the gear position, the gear shifter is currently set.

Then, upon receiving a shift range switch instruction, the controller controls the electric actuator based on the position signal, and shifts the drive object so that the instructed shift range is set.

In such control scheme of the gear shifter, the position signal from the encoder is a count value with reference to a certain reference value that is set after a start-up of an Electronic Control Unit (ECU). Therefore, once a reset of such reference value is performed, the reference value must be set again.

For example, in case a memory of the reference value is lost during a sudden power interruption during a travel of a vehicle, the reference value must be set again during an initialization of the shift range switch device.

The setting of the reference value is performed based on an abutment learning. That is, in the abutment learning, the drive object is abutted to a certain stopper, and the position signal indicative of such a position of the drive object is set and used as the reference value.

However, the abutment of the drive object to the stopper causes a warpage on both of the drive object and the stopper. Further, the amount of warpage may change depending on the temperature or the like, thereby possibly causing a variation of the reference value.

SUMMARY

It is an object of the present disclosure to provide a gear shifter, or a shift range switch device, capable of removing an influence of a warpage in the abutment learning for setting a reference value.

In an aspect of the present disclosure, the shift range switch device of the present disclosure includes a direct current motor having plural phase coils for a rotation of a rotor in the direct current motor by a power supply of a direct electric current orderly to each of the plural phase coils, a drive object driven by a motor torque from the direct current motor, a shift of the drive object enabling a gear shifting of an automatic transmission, a stopper regulating a move range of the drive object on one end of the move range, a position detector outputting a position signal indicative of a position of the rotor, and a controller controlling an operation of the direct current motor based on the position signal.

The controller has a reference value learner that sets a reference value of the position signal by abutting the drive object to the stopper when a preset condition is satisfied. Also, the reference value learner is configured to abut the drive object to the stopper, reduce warpage caused by the abutting, determine the reference value by detecting that the warpage is diminished, and setting a value of the position signal as the reference value upon detecting that the warpage has diminished. Further, the warpage is reduced by (i) an all phase power supply supplying the electric current to all of the plural phase coils of the direct current motor, and (ii) reducing an amount of the electric current supplied to the coils, and by decreasing a pressing force of the drive object pressing the drive object against the stopper while performing the all phase power supply.

According to an embodiment of the present disclosure, the reference value is determined when the warpage is diminished. Thereby the variation of the reference value under the influence of the warpage is resolved.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
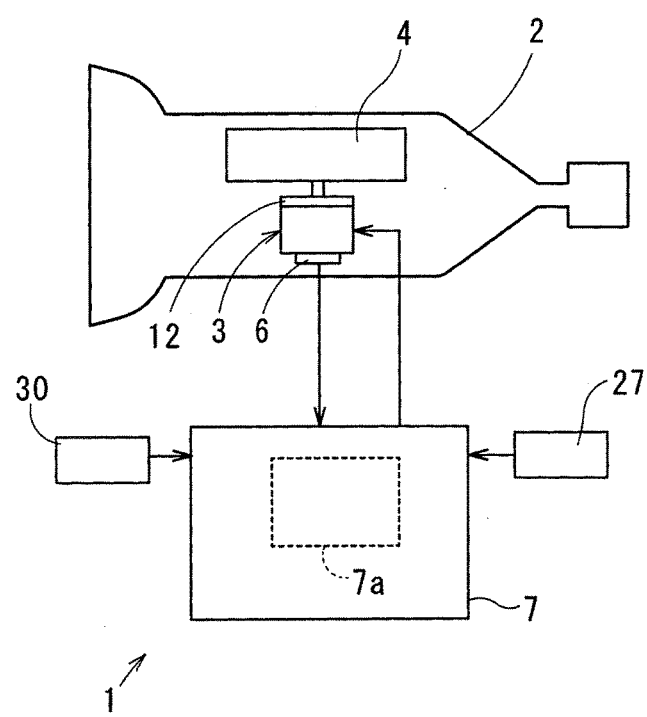
FIG. 1 is a block diagram of a shift range transfer device in a first embodiment of the present disclosure.
Figure 2:
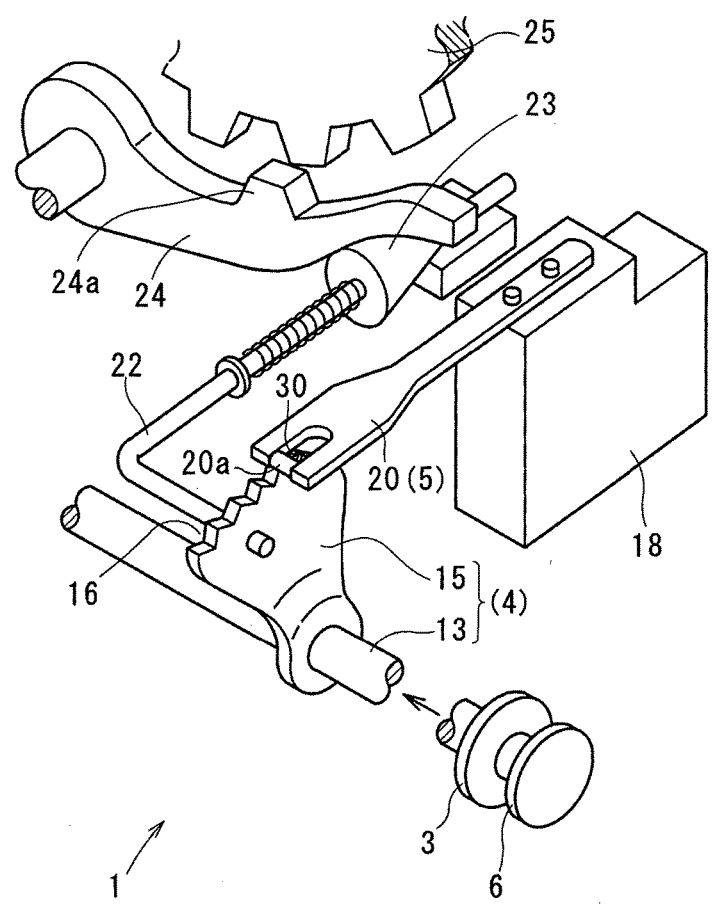
FIG. 2 is a perspective view of the shift range switch device in the first embodiment of the present disclosure.

The embodiments of the present disclosure are described in detail as follows.

EMBODIMENT

Configuration of the First Embodiment

A shift range switch device 1 in the first embodiment is described with reference to FIGS. 1 to 6.

The shift range switch device 1 is a device that changes the shift range of an automatic transmission 2, and is provided with a direct-current motor 3, a drive object 4, a stopper 5, a position detector 6, and a controller 7.

Figure 3:
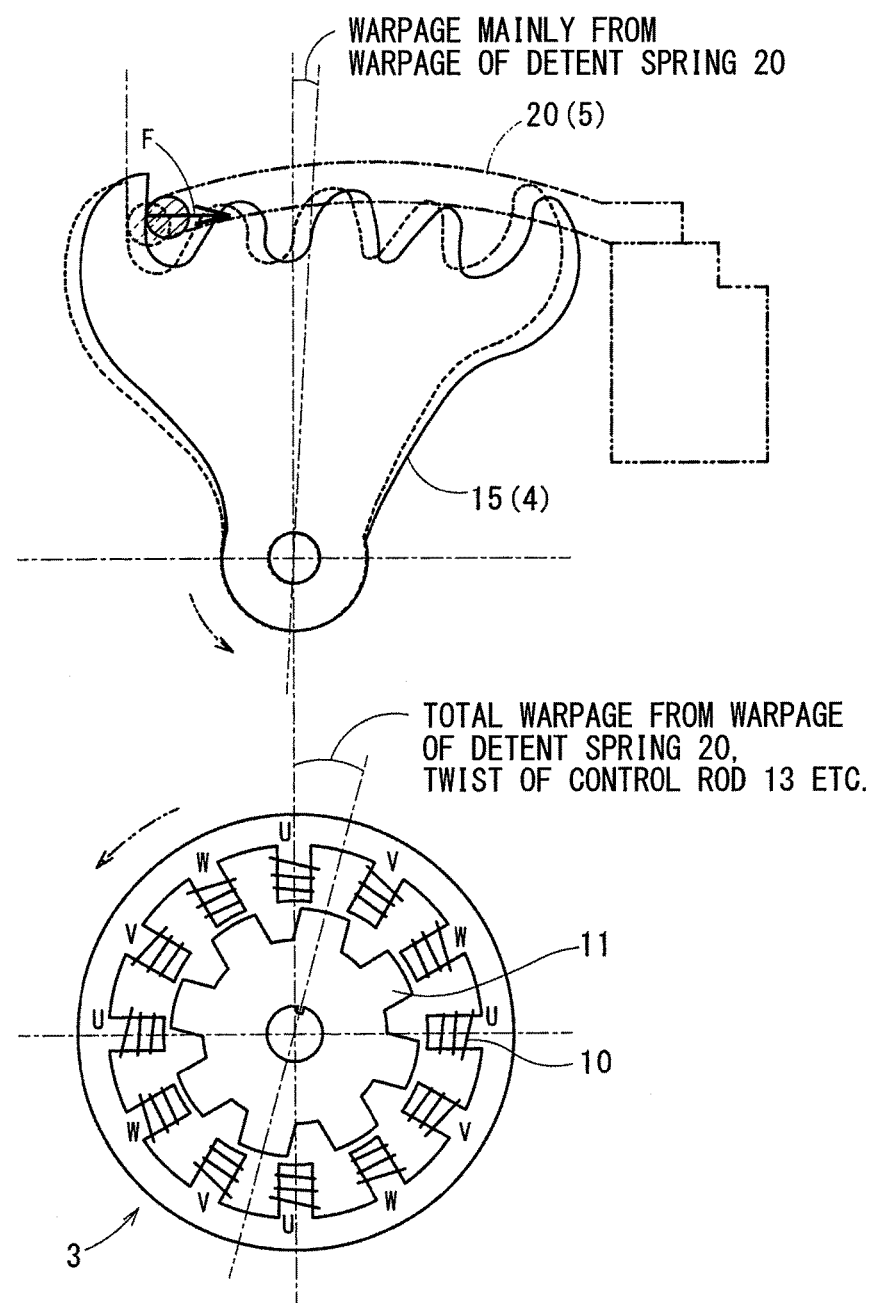
FIG. 3 is an illustration diagram of warpage of components in the shift range switch device in the first embodiment of the present disclosure.
Figure 4:
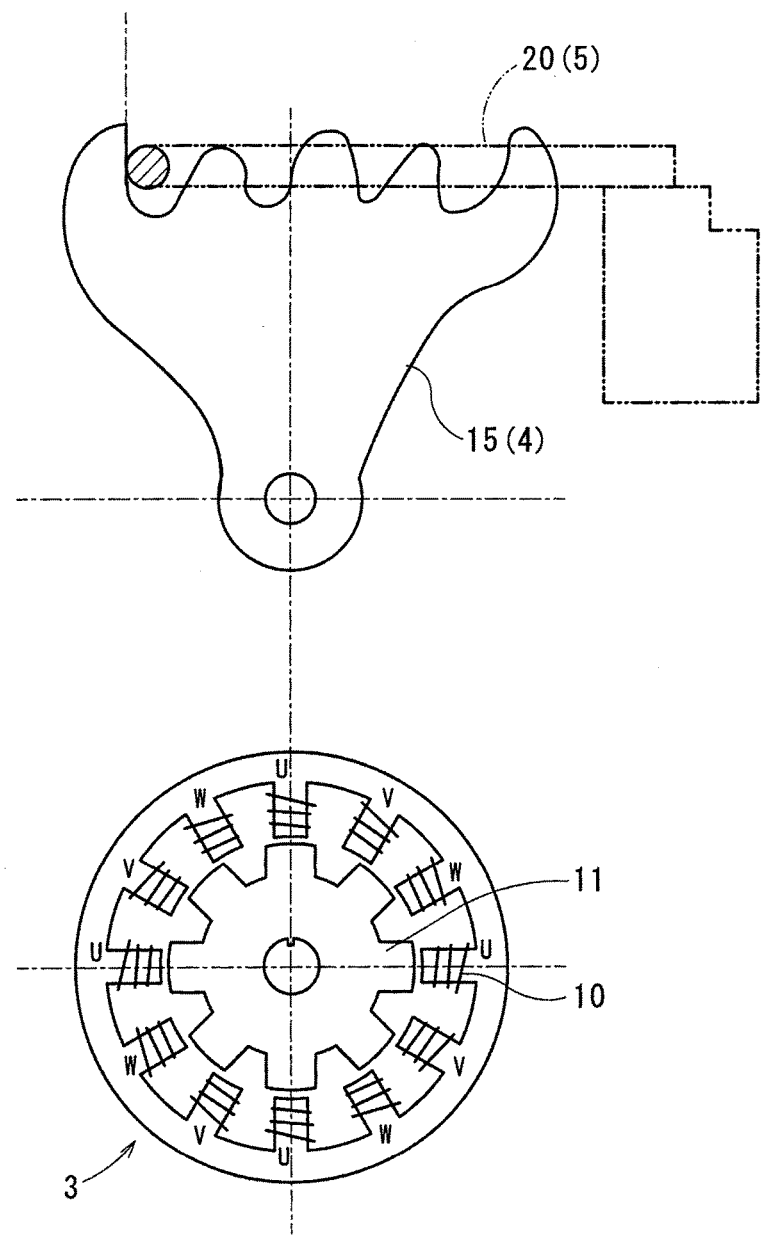
FIG. 4 is an illustration diagram of a no warpage state of the shift range switch device in the first embodiment of the present disclosure.

The direct-current motor 3 has plural phase coils 10 for each of a U phase, a V phase, and a W phase in the present embodiment, and a rotor 11 of the motor 3 is rotated by an orderly supply of a direct electric current to each of those coils 10 (see FIG. 3).

In the present embodiment, a speed reduction mechanism 12 is provided in the direct-current motor 3, and a rotation speed of an output shaft of the motor 3 is determined in consideration of a speed reduction ratio of the speed reduction mechanism 12 based on a rotation speed of the rotor 11.

The drive object 4 switches the shift range of the automatic transmission 2 by shifting its own position, and the shift of the drive object 4 is caused by a drive of a torque from the motor 3.

The drive object 4 has a control rod 13 that is connected with the output shaft of the direct-current motor 3 for rotation, and a detent plate 15 that is attached to the control rod 13 for its back-and-forth move according to the rotation of the control rod 13.

The detent plate 15 has a fan shape, and has plural concave portions 16 arranged along its rotation direction.

The detent plate 15 is connected with a spool (not illustrated) for switching an oil passage of an oil pressure valve body 18 inside the automatic transmission 12, which makes it possible to switch the transmission 2 to a P range, an R range, an N range, a D range or the like according to a shift of the position of the spool when the position of the spool is shifted by the rotation of the detent plate 15.

A detent spring 20 is attached to the oil pressure valve body 18, for holding the detent plate 15 at rotation positions, each corresponding to each of those ranges (i.e., P/R/N/D range).

The detent plate 15 is held at the shift positions when one of the concave portions 16 catches an engager 20a at the tip of the detent spring 20. Thereby, the spool is held in the position of the instructed shift range.

The detent spring 20 abuts to the detent plate 15 within the concave portion 16 on one end along the rotation direction of the detent plate 15, substantially serving as the stopper 5 that regulates the move range of the detent plate 15 on one end in the rotation direction.

The detent plate 15 has a parking rod 22 in L shape connected to the detent plate 15. A cone 23 provided at the tip of the parking rod 22 is in contact with a lock lever 24. The lock lever 24 can move up and down about its own rotation axis. That is, the lock lever 24 moves up and down according to the rotation/shift of the detent plate 15.

When a convex portion 24a of the lock lever 24 fits into a parking gear 25, a vehicle is held in a parking state.

That is, the shift range is in the P (i.e., parking) range when the convex portion 24a of the lock lever 24 fits into the parking gear 25.

The position detector 6 is an encoder (i.e., hereafter designated as an encoder 6) built in the direct-current motor 3.

The encoder 6 is a rotary encoder of magnetic type, for example, and outputs, as a position signal, a count value of a pulse outputted according to the rotation of the rotor 11.

The controller 7 may be an Electronic Control Unit (ECU) that has a microcomputer of well-known type, in which a Central Processing Unit (CPU) is provided for a control process, a calculation process, a memory (e.g., Read-Only Memory (ROM), Random Access Memory (RAM), Static Random Access Memory (SRAM), Electrically Erasable Programmable Read-Only Memory (EEPROM), etc.) is provided for storing programs and data, beside an input circuit, an output circuit, a power supply circuit and the like.

The controller 7 controls the drive of the direct-current motor 3 based on the position signal that is computed based on the output from the encoder 6. The controller 7 has a reference value learner 7a.

When the predetermined conditions are satisfied, the reference value learner 7a abuts the detent plate 15 against the detent spring 20, and sets up a reference value of the position signal.

The predetermined conditions may, for example, be described as a situation in which, after a memory of the reference value is lost due to a sudden power interruption during a travel of a vehicle, a start switch 27 of the shift range switch device 1 is turned ON.

Feature of the First Embodiment

The reference value learner 7a performs an abutment process, a warpage reduction process, and a reference value determination process respectively described below.

In the abutment process, the drive object 4 is abutted against the stopper 5, which causes warpage on one or both of the drive object 4 and the stopper 5.

Warpage of the drive object 4 may be bending, deflection or the like of the detent plate 15 and/or twist/contortion of the control rod 13.

Warpage of the stopper 5 may be bending, deflection or the like of the detent spring 20.

When the direct-current motor 3 is rotated in one direction, the detent plate 15 and the detent spring 20, which are separate from each other in the first place, abut to each other. That is, the detent plate 15 abuts to the detent spring 20. When the motor 3 (i.e., the rotor 11) is further rotated after a no-reaction force state in which the detent plate 15 receives no reaction force from the detent spring 20, the warpage of the detent plate 15 as well as the twist of the control rod 13 and the warpage of the detent spring 20 are forcefully caused.

In FIG. 3, such a situation is illustrated. Note that a position of the detent plate 15 shown in a dashed line is a no warpage position of the detent spring 15.

In a warped state (i.e., when the warpage is caused), the detent spring 15 exerts a pressing force F that pressed the detent plate 15 against the detent spring 20.

In the warpage reduction process, the warpage caused in the abutment process is decreased.

More practically, an all phase power supply is performed for supplying the electric current to all of the plural phase coils 10 of the direct current motor 3, and, while performing the all phase power supply, a supply amount of the electric current to the coils 10 is gradually reduced.

In such manner, the pressing force of the drive object 4 pressing the stopper 5 gradually decreases, thereby allowing a reverse rotation of the detent plate 15 and the rotor 11 according to the reaction force which is caused to cancel the warpage of those components. That is, the detent plate 15 and the rotor 11 rotate in a direction that reduces the warpage of the detent plate 15 and the rotor 11 (see a two-dot chain line arrow in FIG. 3).

In the reference value determination process, when detecting that the warpage is diminished, the value of the position signal at a time of detecting that warpage is diminished is determined as the reference value.

The shift range switch device 1 in the present embodiment is provided with a force detector 30 that outputs a force signal that shows the pressing force F. The force detector 30 is a load sensor or the like disposed either on the engager 20a, or on a surface of the detent plate 15 with which the engager 20a contacts, for example.

The reference value determination process detects that the warpage is diminished based on the force signal.

Figure 5:
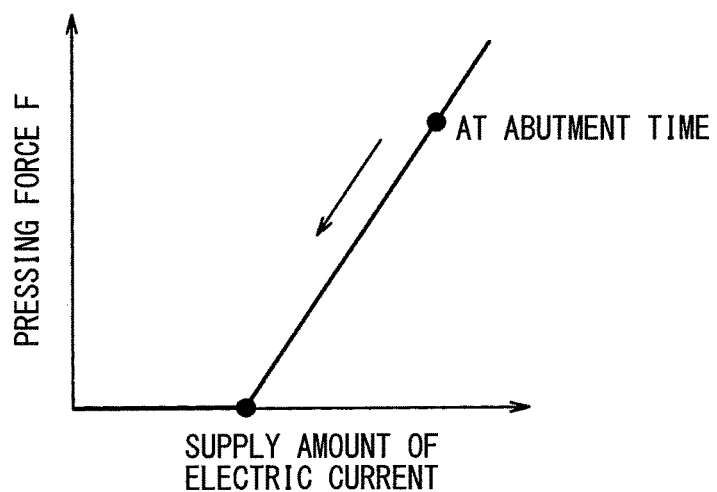
FIG. 5 is a graph of a relationship between an amount of an electric current in a coil and a pressing force in the first embodiment of the present disclosure.

That is, as shown in FIG. 5, as the amount of the electric current decreases, the pressing force also decreases, finally down to zero. That is, in such zero pressing force state, the drive object 4 does not press the stopper 5 eventually. The state that the drive object 4 does not press the stopper 5 is, in other words, the state that the warpage is diminished. See FIG. 4 about the warpage diminished state.

Then, the position signal from the encoder 6 in such warpage diminished state is used as the reference value.

Figure 6:
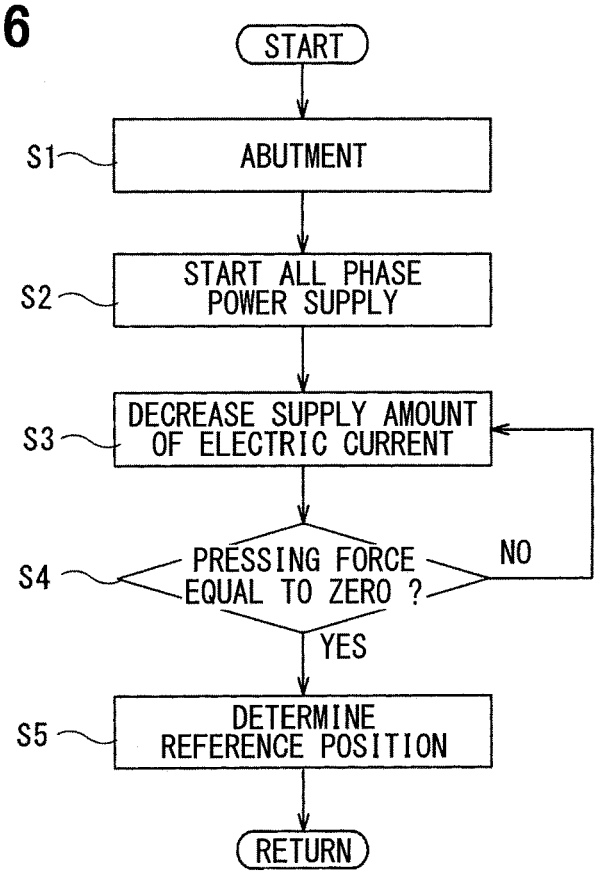
FIG. 6 is a flowchart of control in a reference value learner in the first embodiment of the present disclosure.

FIG. 6 shows a flowchart of control in the reference value learner 7a.

First, in Step S1, the abutment process is performed.

Then, in Step S2, the all phase power supply is started.

Then, in Step S3, the supply amount of the electric current is decreased in a state in which the all phase power supply is performed (i.e., the warpage reduction process).

Then, in Step S4, whether the warpage is diminished or not is determined (i.e., whether the pressing force F is equal to zero or not is determined in the present embodiment). When it is determined that the warpage is diminished (i.e., the position is determined as a reference position in Step S5), the position signal from the encoder 6 at such timing is determined as the reference value, and the reference value is stored in the memory of the microcomputer (i.e., the reference value determination process).

Effects of the First Embodiment

According to the present embodiment, the reference value is determined in the warpage diminished state, the variation of the reference value due to an influence of the warpage will not be caused.

In other words, since the reference value does not vary, even when the environmental conditions such as temperature, etc. change, and the shift range switch device is enabled to accurately switch the shift range.

Further, the warpage is diminished by performing the all phase power supply that supplies the electric current to all of the phase coils 10 of the direct-current motor 3 (i.e., a simple method of gradually decreasing the electric current while performing the all phase power supply).

SECOND EMBODIMENT

Figure 7:
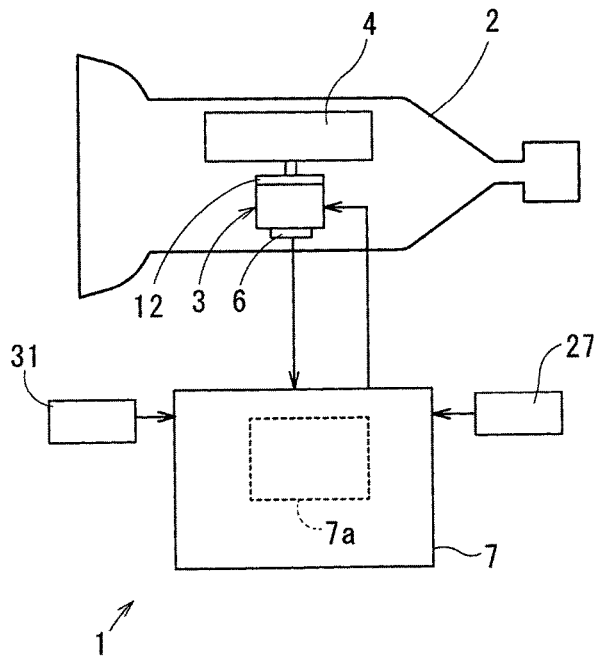
FIG. 7 is a block diagram of the shift range transfer device in a second embodiment of the present disclosure.

The second embodiment is described with reference to FIGS. 7 to 8, which focuses on a difference from the first embodiment.

In the following description, like numbers indicate like parts, that is, pointing to the description of the like parts in the previous embodiments.

The shift range switch device 1 of the present embodiment does not have the force detector 30.

However, the shift range switch device 1 has a drive object position detector 31 that outputs a drive object position signal that shows the position of the drive object 4. More specifically, the drive object position detector 31 is a position sensing device (i.e., hereafter designated as a position sensor 31) that outputs a detent position signal that shows the position of the detent plate 15. The position sensor 31 is attached to a stationary object that does not move/rotate together with the detent plate 15 (i.e., is a sensor that monitors the move of the detent plate 15).

In the present embodiment, the reference value determination process detects that the warpage is diminished, based on the position signal and the detent position signal from the encoder 6.

That is, when the detent plate 15 and the rotor 11 reversely rotate in the warpage reduction process, the rotation of the detent plate 15 and the rotation of the rotor 11 do not match (i.e., do not in synchronization with each other) just after a start of the reverse rotation. This is because the warpage of the detent spring 20 and the twist of the control rod 13 may be reduced, and because of the diminished independent rotations of the spring 20 and the rod 13.

However, once the warpage is entirely diminished, the move/rotation of the detent plate 15 and the move/rotation of the rotor 11 start to match (i.e., start to synchronize with each other). The position signal at such a synchronization timing (i.e., in a synchronization state) is used as the reference value.

Figure 8:
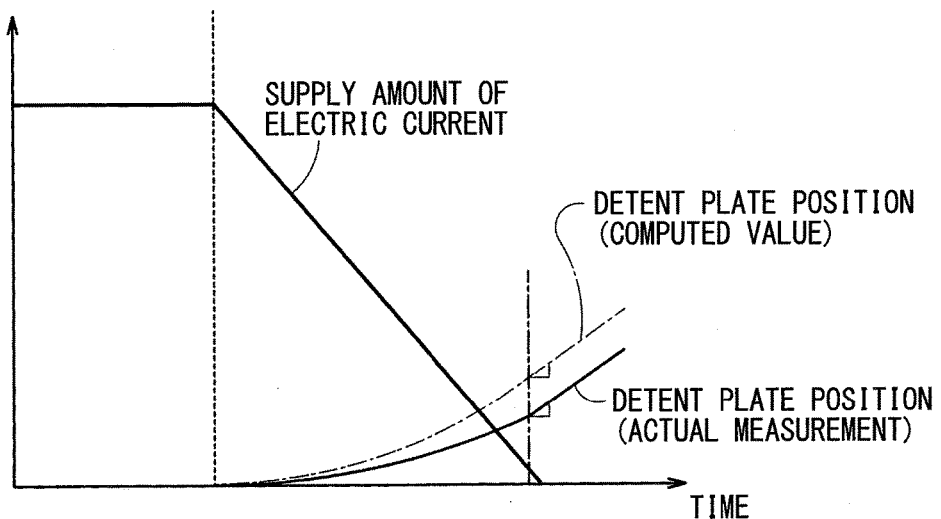
FIG. 8 is a time diagram of a relationship between the amount of the electric current in the coil, a detent plate position (i.e., a detection value), and a detent plate position (i.e., a computed value) in the second embodiment of the present disclosure.

More practically, as shown in FIG. 8, when a per-unit-time change of the position of the detent plate 15 that is computed based on an actual measurement from the position sensor 31 is compared with a per-unit-time change of the position of the detent plate 15, which is computed by using the position signal from the encoder 6, two values (i.e., a speed of change, a slope of the per-unit-time change of the position) match with each other at a certain timing. The reference value is determined at such timing of the matching of the two values. The per-unit-time change of the position may be rephrased as the position change rate.

The position change rate of the detent plate 15 computed by using the position signal from the encoder 6 is the position change rate of the rotor 11 taking the speed reduction rate of the speed reduction mechanism 12 into consideration. This is because the position change rate of the detent plate 15 is equal to the position change rate of the rotor 11 after such a position change (i.e., rotation) is "reduced" by the speed reduction mechanism 12, when the rotor 11 and the detent plate 15 are in the synchronization state (i.e., when rotating in synchronization with each other).

In the present embodiment, instead of performing a zero pressing force determination in Step S4 of FIG. 6 for determining whether the pressing force F is equal to zero, whether the move of the detent plate 15 and the move of the rotor 11 start to synchronize with each other is determined. That is, whether the position change rate of the detent plate 15 based on the actual measurement from the position sensor 31 matches (i.e., is equal to) the position change rate of the detent plate 15 computed by using the position signal from the encoder 6 is determined.

According to the present embodiment, the same effects as the first embodiment are achievable.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A gear shifter comprising:
   a direct current motor having plural phase coils for a rotation of a rotor in the direct current motor by a power supply of a direct electric current orderly to each of the plural phase coils;
   a drive object driven by a motor torque from the direct current motor, a shift of the drive object enabling a gear shifting of an automatic transmission;
   a stopper regulating a move range of the drive object on one end of the move range;
   a position detector outputting a position signal indicative of a position of the rotor; and
   a controller controlling an operation of the direct current motor based on the position signal, wherein
   the controller has a reference value learner that sets a reference value of the position signal by abutting the drive object to the stopper when a preset condition is satisfied,
   the reference value learner is configured to:
      abut the drive object to the stopper;
      reduce warpage caused by the abutting; and
      determine the reference value by detecting that the warpage is diminished, and setting a value of the position signal as the reference value upon detecting that the warpage has diminished, and
   the warpage is reduced by (i) an all phase power supply supplying the electric current to all of the plural phase coils of the direct current motor, and (ii) reducing an amount of the electric current supplied to the coils, and by decreasing a pressing force of the drive object pressing the drive object against the stopper while performing supply of the electric current from the all phase power supply.

2. The gear shifter of claim 1 further comprising:
   a force detector outputting a force signal indicative of the pressing force pressing the drive object against the stopper, wherein
   the determining of the reference value is configured to detect that the warpage is diminished, based on the force signal.

3. The gear shifter of claim 1 further comprising:
   a drive object position detector outputting a drive object position signal indicative of a position of the drive object, wherein
   the determining of the reference value is configured to detect that the warpage is diminished, based on the position signal regarding the rotor, and the drive object position signal indicative of the position of the drive object.

* * * * *